(12) United States Patent
Servin et al.

(10) Patent No.: US 11,708,524 B1
(45) Date of Patent: Jul. 25, 2023

(54) SUPERHEATED PHASE CHANGING NANODROPLETS FOR HYDROCARBON RESERVOIR APPLICATIONS

(71) Applicant: SAUDI ARABIAN OIL COMPANY, Dhahran (SA)

(72) Inventors: Jesus Manuel Felix Servin, Dhahran (SA); Amr I. Abdel-Fattah, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/708,672

(22) Filed: Mar. 30, 2022

(51) Int. Cl.
| | |
|---|---|
| C09K 8/592 | (2006.01) |
| C09K 8/588 | (2006.01) |
| C09K 8/584 | (2006.01) |
| C09K 8/94 | (2006.01) |
| C09K 8/88 | (2006.01) |
| E21B 37/00 | (2006.01) |
| E21B 43/25 | (2006.01) |
| E21B 28/00 | (2006.01) |
| C09K 8/60 | (2006.01) |

(52) U.S. Cl.
CPC .............. *C09K 8/592* (2013.01); *C09K 8/584* (2013.01); *C09K 8/588* (2013.01); *C09K 8/604* (2013.01); *C09K 8/885* (2013.01); *C09K 8/94* (2013.01); *E21B 28/00* (2013.01); *E21B 37/00* (2013.01); *E21B 43/25* (2013.01); *C09K 2208/06* (2013.01); *C09K 2208/10* (2013.01)

(58) Field of Classification Search
CPC ..................................................... E21B 37/00
See application file for complete search history.

(56) References Cited

U.S. PATENT DOCUMENTS

| | | | | |
|---|---|---|---|---|
| 2,811,209 A | * | 10/1957 | Elkins | .................... C09K 8/524 |
| | | | | 166/309 |
| 11,585,195 B2 | * | 2/2023 | Hardin | .................... E21B 43/40 |
| 2008/0142226 A1 | * | 6/2008 | Wilson | .................... E21B 37/06 |
| | | | | 166/177.5 |
| 2012/0231979 A1 | | 9/2012 | Peiffer et al. | |
| 2014/0262529 A1 | | 9/2014 | Quintero et al. | |
| 2018/0045843 A1 | | 2/2018 | Sheiko et al. | |

(Continued)

OTHER PUBLICATIONS

Moyer, Linsey C., et al. "High-intensity focused ultrasound ablation enhancement in vivo via phase-shift nanodroplets compared to microbubbles", Journal of Therapeutic Ultrasound. Dec. 2015, pp. 1-9 [9 Pages].

(Continued)

*Primary Examiner* — Angela M DiTrani Left
*Assistant Examiner* — Avi T Skaist
(74) *Attorney, Agent, or Firm* — Osha Bergman Watanabe & Burton LLP

(57) ABSTRACT

A method includes injecting an aqueous-based injection fluid into a wellbore at a first temperature, where the aqueous-based injection fluid includes phase-changing nanodroplets having a liquid core and a shell. The method also includes exposing the phase-changing nanodroplets to a second temperature in the wellbore that is greater than or equal to a boiling point of the liquid core to change a liquid in the liquid core to a vapor phase and expand the phase-changing nanodroplets, thus removing debris from the wellbore and surrounding area.

10 Claims, 1 Drawing Sheet

(56) References Cited

U.S. PATENT DOCUMENTS

2018/0223180 A1  8/2018  Hall et al.

OTHER PUBLICATIONS

Kawabata, Ken-Ichi, et al. "Nanoparticles with multiple perfluorocarbons for controllable ultrasonically induced phase shifting", Japanese Journal of Applied Physics, vol. 44, No. 6S. Jun. 24, 2005, pp. 4548-4552. [4 Pages].

Martin, Amanda L., et al. "Intracellular growth of nanoscale perfluorocarbon droplets for enhanced ultrasound-induced phase-change conversion", Ultrasound in Medicine & Biology, vol. 38, No. 10. Aug. 2012, pp. 1799-1810. [11 Pages].

Wilson, Katheryne, et al. "Biomedical photoacoustics beyond thermal expansion using triggered nanodroplet vaporization for contrast-enhanced imaging", Nature communications. Jan. 10, 2012, pp. 1-10 [10 Pages].

Santiesteban, Daniela Y., et al. "Color-coded perfluorocarbon nanodroplets for multiplexed ultrasound and photoacoustic imaging", Nano research. Apr. 2019, pp. 741-747 [6 Pages].

Pisani, E., et al. "Polymeric nano/microcapsules of liquid perfluorocarbons for ultrasonic imaging: physical characterization", Langmuir. Apr. 25, 2006, pp. 4397-4402 [5 Pages].

Hallam, Kristina A., et al. "Laser-activated perfluorocarbon nanodroplets: a new tool for blood brain barrier opening", Biomedical Optics Express, vol. 9, No. 9. Sep. 1, 2018, pp. 4527-4538 [11 Pages].

Mountford, Paul A. C. "Molecular thermodynamics of superheated lipid-coated fluorocarbon Nanoemulsions", Doctoral dissertation, University of Colorado at Boulder. Jul. 17, 2015, pp. 1-171 [191 Pages].

Lea-Banks, H., et al. "Ultrasound-responsive droplets for therapy: A review", Journal of Controlled Release. Jan. 10, 2019, pp. 144-154 [29 Pages].

\* cited by examiner

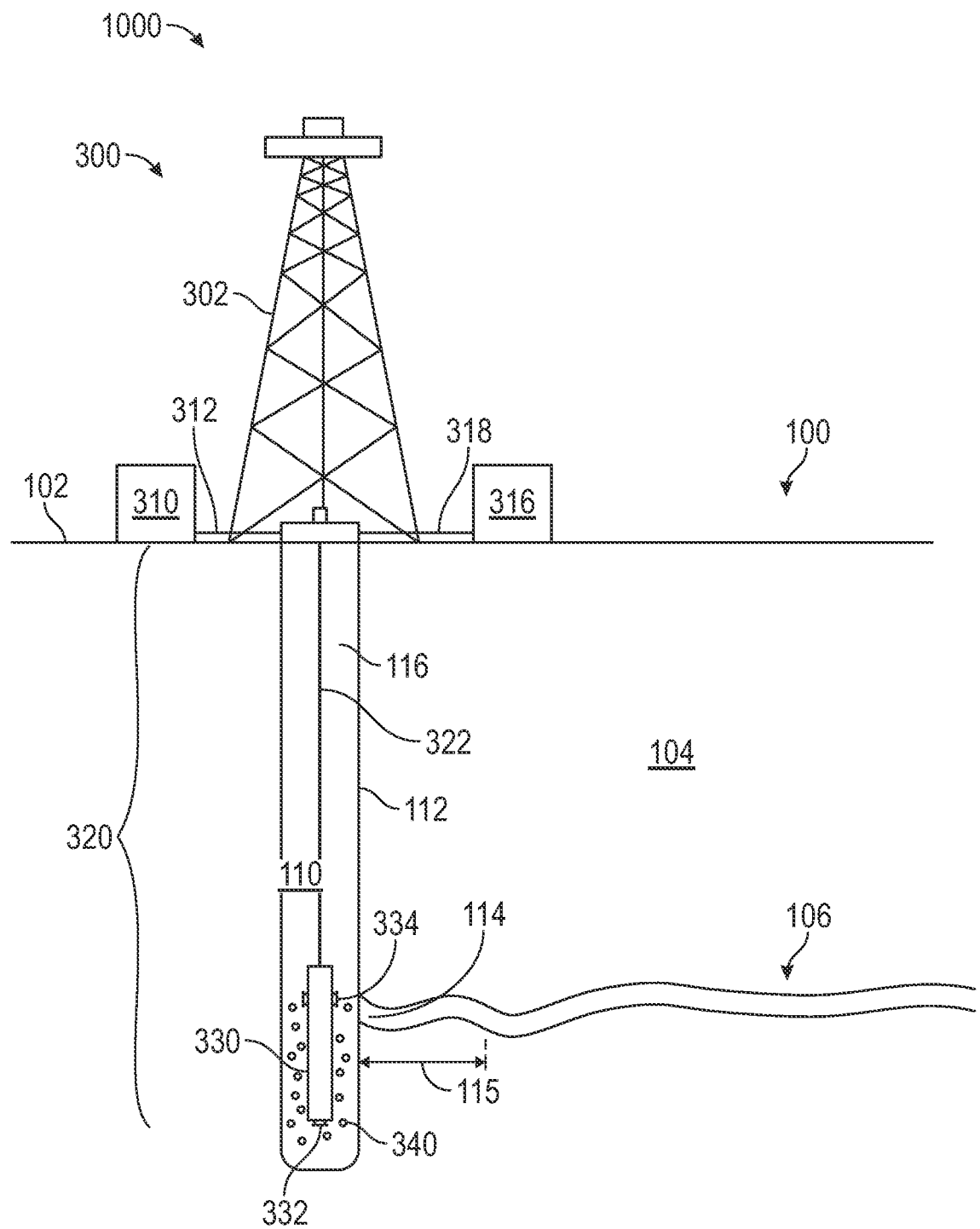

SUPERHEATED PHASE CHANGING NANODROPLETS FOR HYDROCARBON RESERVOIR APPLICATIONS

BACKGROUND

Hydrocarbon resources, including oil and gas, are typically located below the surface of the earth in subterranean porous rock formations. To access these resources, wells are drilled to extract the hydrocarbon fluids from the reservoir. However, drilling may also damage the formation physically or chemically due to the interaction between the drill bit, a reamer, or the drilling fluid and the rocks and minerals in the formation. For example, mud filtrate within the drilling mud may deposit on the face of the wellbore, forming a layer (termed "filter cake" or "mud cake") adhered to the wellbore wall. Additionally, the pores of the subterranean formation near the wellbore may be impacted by pore plugging (that is, formation damage) resulting from fines or filtrate invasion either through transport phenomenon or by being mechanically forced into the pores. Such damage mainly occurs at the interface between the wellbore and the reservoir, called the "near wellbore region" (NWR), or it may extend deeper within.

Hydrocarbon production traditionally may be stimulated by removing the formation damage elements to the wellbore walls and NWR by applying a chemical (for example, acids) or by utilizing a mechanical solution. Such remediation may allow hydrocarbons from the reservoir to traverse through the NWR and into the wellbore.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method that includes providing an injection fluid with phase-changing nanodroplets and an aqueous-based fluid. The phase-changing nanodroplets include a liquid core and a shell. The injection fluid may then be injected into a wellbore at a first temperature. After injection into the wellbore, the phase-changing nanodroplets are exposed to a second temperature that is greater than or equal to a boiling point of the liquid core. The exposure of the phase-changing nanodroplets to the second temperature changes a liquid in the liquid core to a vapor phase and expands the phase-changing nanodroplets to remove debris from the wellbore and surrounding area by expansion of the phase-changing nanodroplets.

In another aspect, embodiments disclosed herein relate to a method that includes providing an injection fluid with phase-changing nanodroplets and an aqueous-based fluid. The phase-changing nanodroplets include a liquid core and a shell. The method may further include injecting the injection fluid through a well and to a depth of a formation and exposing the phase-changing nanodroplets to an external stimulus. Upon exposure to the external stimulus, the liquid core of the phase-changing nanodroplets undergoes a liquid-to-vapor phase change causing the phase-changing nanodroplets to expand. The method may further include stimulating the formation at a near wellbore region using the expansion of the phase-changing nanodroplets.

In yet another aspect, embodiments disclosed herein relate to a composition including 0.1 to 10 wt % phase-changing nanodroplets having a liquid perfluorocarbon core and a shell encapsulating the liquid perfluorocarbon core, and 50 to 97 wt % of an aqueous-based injection fluid selected from the group consisting of wellbore clean-up fluid, formation stimulation fluid, and combinations thereof.

Other aspects and advantages of the claimed subject matter will be apparent from the following description and the appended claims.

BRIEF DESCRIPTION OF DRAWINGS

FIG. 1 depicts a well system for treating the wellbore and near wellbore region of a reservoir according to one or more embodiments.

DETAILED DESCRIPTION

A major concern with using strong acids near the reservoir is that mud cake and other wellbore damage removal may be non-uniform due to differences in the composition or thickness, leaving portions of the wellbore wall and NWR with debris and fluid blockages. Another issue is that strong acids tend to instantaneously react with subterranean formation material upon contact due to the amount of acid-reactive material present and the acid strength. This results in almost immediate depletion of the strong acid, resulting in the creation of wide yet shallow (that is, not penetrating deep into the subterranean formation relative to the distance from the wellbore) and non-uniform wormholes through the subterranean formation. These shallow-depth wormholes are not as desirable as deep fluid pathways through the reservoir that would function as conduits for hydrocarbon fluid flow into the wellbore. Deep fluid pathways may enhance the rate and efficiency of hydrocarbon extraction from the reservoir.

Embodiments disclosed herein generally relate to compositions and methods for wellbore cleanup and/or formation stimulation using superheated phase-changing nanodroplets. The superheated phase-changing nanodroplets may include a fluid perfluorocarbon (PFC) compound core encapsulated by a shell. One or more embodiments relate to superheated phase-changing nanodroplets that may be included in an aqueous-based injection fluid. The liquid PFC core of superheated phase-changing nanodroplets may have a boiling point equal to a downhole temperature corresponding to a target depth downhole. Methods in accordance with some embodiments may involve injecting an aqueous-based injection fluid comprising phase-changing nanodroplets into a wellbore and exposing the injection fluid to an elevated temperature downhole, resulting in superheating the phase-changing nanodroplets and explosive vaporization of the liquid PFC core of the nanodroplets. Vaporization of the liquid PFC core may cause rapid expansion of the phase-changing nanodroplets, generating an acoustic energy wave that may displace, break, or loosen debris such as mud cakes and fines from the walls of the wellbore and near wellbore region (NWR).

In one or more embodiments, explosive boiling of the PFC core in superheated phase-changing nanodroplets may occur, in part, due to the surface tension provided by the surrounding shell. The core-shell structure of the phase-changing nanodroplets may provide a pressure difference, known as Laplace pressure, between the inside and outside of the shell of superheated phase-changing nanodroplets of the present disclosure. Laplace pressure may be described according to Equation 1, below.

$$\Delta P = P_{in} - P_{out} = \frac{2}{R}\gamma \qquad \text{Eq. 1}$$

In Equation 1, R is the radius and γ is the interfacial tension of a given superheated phase-changing nanodroplet. Accordingly, it can be appreciated that the Laplace pressure may become greater in smaller nanodroplets and at higher interfacial tensions. As derived from Equation 1, the pressure inside disclosed superheated phase-changing nanodroplets may be calculated according to Equation 2, below.

$$P_{in} = P_{out} + \frac{2}{R}\gamma \qquad \text{Eq. 2}$$

In one or more embodiments, the temperature at which a phase-changing nanodroplet may vaporize at a known pressure may be estimated according to the Antoine equation, shown below.

$$T = \frac{B}{A - \log_{10} p} - C \qquad \text{Eq. 3}$$

In Equation 3, A, B, and C are component-specific constants that may be obtained empirically. As shown in Equation 3, a liquid at high pressure may have a boiling point that is higher than the same liquid in ambient conditions. The pressure inside the phase-changing nanodroplets of one or more embodiments may be elevated, and thus, the liquid PFC cores may have boiling points higher than that of the same PFC compounds in bulk at ambient pressure. Accordingly, the pressure differential may allow the core to remain in liquid state (where in a free environment, the core may otherwise be in a gas state), and the liquid core may remain stable until exposed to an external stimulus such as an increase in temperature or ultrasonic excitation. For example, one or more ultrasonic devices (e.g., downhole ultrasonic devices) may be used to emit ultrasonic waves to the phase-changing nanodroplets to initiate a liquid-to-gas phase change in the liquid core and expand the phase-changing nanodroplets.

In one or more embodiments, explosive vaporization of the PFC core may generate gas bubbles. "Cavitation" is the generation and energetic failure of gas or vapor-filled voids within a liquid. Small vapor-filled bubbles may be formed when the pressure of a liquid is less than the vapor pressure of the liquid. These bubbles, once formed, may collapse when subjected to a greater pressure. The collapse of bubbles occurs when the pressure exceeds the vapor pressure of the bubble. An acoustic wave may provide this temporary pressure increase to induce bubble collapse. Accordingly, some embodiment methods may include providing acoustic energy downhole to promote cavitation of gas bubbles formed from the rapid expansion of superheated phase-changing nanodroplets disclosed herein.

The collapse of such bubbles may cause a high energy shock wave that further forms a fluidic microjet. The resultant microjets from the cavitation of bubbles may have a speed of about 100 meters per second (m/s). Such speed in micro-sized fluid jets may lead to impact pressures on nearby solid surfaces of up to about 50 megapascals (MPa). The fluidic microjets may be utilized in one or more embodiments to dislodge or destroy debris in the wellbore and NWR.

In one or more embodiments, compositions and methods disclosed herein may be used for wellbore treatment and/or formation stimulation. While wellbore treatment and formation stimulation may include increasing pathways between a reservoir and a wellbore, it may be desirable to retain mud cake or other wellbore fluid residue on a portion of the reservoir face to restrict fluid access between the wellbore and various formations in the subsurface. As described above, the liquid PFC core of phase-changing nanodroplets may have a specific boiling point. The boiling point may be equal to that of the temperature at a specific downhole region. As such, explosive boiling of the phase-changing nanodroplets and treatment of the wellbore or NWR, may only occur at the target temperature. Accordingly, methods of using phase-changing nanodroplets having pre-selected boiling points for wellbore treatment and/or formation stimulation may effectively remediate drilling damage at specific regions of the wellbore and NWR having temperatures greater than or equal to the pre-selected boiling points.

For example, as described above, encapsulating a liquid PFC core in a shell may increase the boiling point of the liquid PFC core. Further, the size of the liquid core encapsulated by a shell affects the boiling point of the liquid core, where generally, decreasing the size of the liquid core may increase the boiling point of the liquid core. Accordingly, a phase-changing nanodroplet may be tailor-made to have a liquid core with a selected boiling point by selection of the liquid core and shell material and size. For example, a liquid used to form a liquid core may have an initial boiling point under an ambient pressure, when the liquid is not within the shell. When an amount of the liquid is encapsulated in a shell (forming a liquid core having a certain size), the boiling point of the liquid core within the shell is greater than the initial boiling point of the liquid. In such manner, the boiling point of a liquid core in a phase-changing nanodroplet may be designed to correspond with elevated temperatures of a targeted downhole region, which may allow for a delayed activation of the phase-changing nanodroplets until the nanodroplets reach the targeted downhole region.

FIG. 1 depicts a well system for treating the wellbore walls or NWR of a reservoir according to one or more embodiments. The well system 1000 depicts a geological formation 100 with an associated treatment system 300 mounted on the surface 102 of the geological formation 100, where the surface 102 represents the surface of the earth. Surface 102 may be located above water, under water, or under ice. Below the surface 102 is the subsurface 104, which may include a reservoir 106. Reservoir 106 is a hydrocarbon-bearing formation.

Traversing the subsurface 104 is a wellbore 110. Wellbore 110 is defined by wellbore wall 112. The wellbore 110 traverses through the reservoir 106 such that the wellbore 110 is in fluid communication with the NWR 115 portion of the reservoir 106 at reservoir face 114.

With the associated treatment system 300, a derrick 302 is located on the surface 102 to support a work string 320 positioned in the wellbore 110. The work string 320 comprises a pipe 322 that runs from the surface 102 downhole in the wellbore 110 that terminates near the reservoir 106 with a coupled downhole tool 330. The work string 320 and the wellbore wall 112 defines a wellbore annulus 116 along the length of the wellbore 110. Wellbore annulus 116 is the void in the wellbore 110 not occupied by the work string 320.

On the surface 102, the treatment system 300 includes surface emulsion generation tool 310, which is configured to generate an emulsion of phase-changing nanodroplets in aqueous-based injection fluid utilized for treatment of the wellbore wall 112 and/or the NWR 115. Surface emulsion generation tool 310 is fluidly coupled to the downhole tool 330 using liquid treatment conduit 312, which is fluidly coupled to the downhole tool 330 via pipe 322. The phase-changing nanodroplets 340 are introduced into the wellbore 110 via liquid treatment discharge 332 of downhole tool 330.

Downhole tool 330 may be used to inject phase-changing nanodroplets 340 into the wellbore 110 at any depth from the surface 102. The phase-changing nanodroplets 340 may be injected at a depth having a temperature below the boiling point of the PFC core of phase-changing nanodroplets 340. As such, the phase-changing nanodroplets may naturally travel downhole, and upon reaching a downhole temperature similar to that of the PFC core boiling point, the phase-changing nanodroplets may expand and treat the wellbore or NWR.

Treatment system 300 also includes a surface acoustic signal generator 316, which may be used to generate an acoustic or ultrasonic signal for use in treatment of the wellbore wall 112 and/or the NWR 115 of the reservoir 106. Surface acoustic signal generator 316 is signally coupled to the downhole tool 330 using an acoustic signal conduit 318, which may run along the interior of pipe 322. Transmission of acoustic or ultrasonic signals into wellbore 110 and the NWR 115 originates from an acoustic signal transmitter 334 of downhole tool 330.

While the well system 1000 shown in FIG. 1 shows an example using a derrick 302 system to hold a work string 320 in the well, other tools and system configurations known in the art may be used to provide a fluid conduit downhole, through which an emulsion of phase-changing nanodroplets may be sent downhole from a surface emulsion generation tool 310. For example, in some embodiments, a phase-changing nanodroplet treatment system may be incorporated into a drilling operation, where an emulsion of phase-changing nanodroplets may be sent downhole via a drill string. In some embodiments, a phase-changing nanodroplet treatment system may be incorporated into a production operation (where a well has been completed and production from the well has already been initiated). For example, a phase-changing nanodroplet treatment system may be incorporated into a production operation showing a decline in the productivity index (PI), where an emulsion of phase-changing nanodroplets may be sent downhole via a fluid conduit to treat a portion of the well and increase PI. Further, other tools and systems known in the art may be used to transmit signals, e.g., acoustic, ultrasonic, or electric signals, downhole.

Composition of Phase-Changing Nanodroplets

As previously described, the present disclosure relates to the use of phase-changing nanodroplets for wellbore cleanup and/or formation stimulation. Phase-changing nanodroplets in accordance with the present disclosure include a liquid PFC core encapsulated by a shell.

Various PFC compounds may be included in the liquid core of the phase-changing nanodroplets. Specific PFC compounds may be selected for use in phase-changing nanodroplets of one or more embodiments according to the downhole temperature of the target treatment region. Suitable PFC compounds may have a boiling point when encapsulated in a shell similar to that of the temperature of the target region of the wellbore or NWR (e.g., within ±5° C. of the downhole temperature of the target region). Exemplary PFC compounds and their boiling points include octafluoropropane (−39° C.), perfluorobutane (−2° C.), perfluoropentane (30° C.), perfluorohexane (59° C.), perfluorohexyl bromide (97° C.), perfluorooctyl bromide (142° C.), and perfluoro-15-crown-5-ether (146° C.). As previously described, a PFC compound in nanodroplet form may have a higher boiling point than the same PFC compound at ambient conditions. For example, an octafluoropropane liquid core may have an increased boiling point when encapsulated in a nanodroplet shell, e.g., a boiling point of greater than 37° C. in a nanodroplet having a diameter of about 700 microns. In some embodiments, a mixture of at least two PFC compounds may be included in the liquid core of phase-changing nanodroplets. The boiling point of the PFC core may range from about 50 to 200 ° C. For example, PFC cores may have a boiling point ranging from a lower limit of any of 50, 60, 70, 80, 90, 100, 110, and 120° C. to an upper limit of any of 130, 140, 150, 160, 170, 180, 190, and 200° C., where any lower limit may be paired with any mathematically compatible upper limit.

In one or more embodiments, the PFC core may be included in a phase-changing nanodroplet in an amount ranging from 50 to 80%, by volume, based on the total volume of the nanodroplet. For example, phase-changing nanodroplets according to the present disclosure may include a PFC in an amount having a lower limit of any of 50, 55, 60, 65, and 70% and an upper limit of any of 60, 65, 70, 75, and 80% where any lower limit may be paired with any mathematically compatible upper limit.

The liquid PFC core may be encapsulated by a shell made of various materials. Suitable shell materials include, but are not limited to, polymers, surfactants, and lipids. For example, the shell of a phase-changing nanodroplet may be made of lipids such as phospholipids and bovine serum albumin (BSA); surfactants including perfluorosulfonic acids such as perfluorooctanesulfonic acid (PFOS) and perfluorobutanesulfonic acid (PFBS), perfluorocarboxylic acids such as perfluorooctanoic acid (PFOA) and perfluorohexanoic acid (PFHxA), and other fluorosurfactants such as nonionic ethoxylated fluorosurfactants including Zonyl FSO from Sigma Aldrich; or polymers such as poly(lactic-co-glycolic acid), zwitterionic polymers, fluoroalkyl polymers including fluoroalkyl methacrylate, fluoroalkyl 2-trifluoromethylacrylate, fluoroalkyl(C6) ethyl acrylate, fluoroalkyl pentacarbonylmanganese(I), co-polymers of poly(ethylene) glycol and poly(l-lactic) acid (PEG-PLLA), and co-polymers of PEG and polycaprolactone (PEG-PCL), among others.

Phase-changing nanodroplets according to the present disclosure may include a shell in an amount ranging from 20 to 50%, by volume, based on the total volume of the nanodroplet. For example, in one or more embodiments, the shell may be included in the phase-changing nanodroplet in an amount having a lower limit of any of 20, 25, 30, 35, and 40% and an upper limit of any of 30, 35, 40, 45, and 50%, where any lower limit may be paired with any mathematically compatible upper limit. In some embodiments, the core material may form a first volume of the phase-changing nanodroplet, and the remaining volume of a phase-changing nanodroplet may be the shell material. For example, a phase-changing nanodroplet may have a PFC core forming 50 to 80% of the volume of the droplet and a shell forming the remaining 50 to 20% of the volume of the droplet.

In one or more embodiments, phase-changing nanodroplets have a size ranging from 10 to 1000 nm in average diameter. For example, the phase-changing nanodroplets may range in size from a lower limit of any of 10, 20, 50, 100, 150, 200, 250, 300, and 400 nm to an upper limit of any of 500, 600, 700, 750, 800, 850, 900, 950, and 1000 nm, where any lower limit may be paired with any mathematically compatible upper limit.

Phase-changing nanodroplets according to the present disclosure may be prepared by providing a PFC-in-water emulsion stabilized by shell material. Such emulsions may be generated by sonication, amalgamation, homogenization, or microfluidics.

For example, methods of one or more embodiments may include dissolving the shell material into an organic solvent to provide an organic solution. Suitable organic solvents may be immiscible with water. Examples of suitable organic solvents include chloroform and dichloromethane. The organic solution may then be added to an aqueous phase. The aqueous phase includes water. Then, the solution may be agitated at a suitable temperature for an amount of time to allow an emulsion including a continuous phase and nanodroplets to form. The emulsion may be agitated at a temperature ranging from 0 to 50° C. In one or more embodiments, the emulsion may be agitated for an amount of time ranging from 2 to 24 hours.

After being agitated at a suitable temperature for an amount of time, the nanodroplets may be separated from the continuous phase and washed to provide pure phase-changing nanodroplets according to the present disclosure.

Other examples of methods that may be used to form phase-changing nanodroplets include methods that have been used to form nanodroplets for bio-applications. For example, suitable methods for forming phase-changing nanodroplets are described in Santiesteban et al. (2019) (encapsulating perfluoropentane in phospholipid shells), Wilson et al. (2011) (synthesizing perfluoropentane nanodroplets surrounded by a shell of bovine serum albumin (BSA)), Hallam et al, (2018) (synthesizing nanodroplets of perfluorohexane stabilized by a fluorosurfactant), and Pisani et al. (2006) (describing a method to produce nanodroplets of perfluoropentane, perfluorohexane, perfluorooctane, and perfluorodecalin stabilized by polymeric shells), each of which are incorporated herein by reference.

Composition of Injection Fluid Including Phase-Changing Nanodroplets

As described above, the phase-changing nanodroplets in accordance with the present disclosure may be added to aqueous-based injection fluid. The aqueous-based injection fluid includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters, and combinations thereof, that are suitable for use in a wellbore environment. Contaminants in the water such as salts, ions, minerals, organics, and combinations thereof may reduce the interfacial tension between the droplets and the continuous medium, which would reduce the inner pressure of the droplets and thus boiling temperature of the phase-changing nanodroplets. Thus, according to embodiments of the present disclosure, water without such contaminants may be used, or such contaminants may be measured and used in calculations (e.g., see Eq. 1) for designing a selected boiling temperature of the phase-changing nanodroplets.

In one or more embodiments, the injection fluid may contain water in a range of from about 50 wt % to 97 wt % based on the total weight of the injection fluid. In one or more embodiments, the injection fluid may comprise greater than 70 wt % water based on the total weight of the injection fluid.

In one or more embodiments, the water used for the injection fluid may have an elevated level of salts or ions versus fresh water, such as salts or ions naturally-present in formation water, production water, seawater, and brines. In one or more embodiments, salts or ions are added to the water used to increase the level of a salt or ion in the water to effect certain properties, such as density of the injection fluid or to mitigate the swelling of clays that come into contact with the drilling fluid. Without being bound by any theory, increasing the saturation of water by increasing the salt concentration or other organic compound concentration in the water may increase the density of the water, and thus, the injection fluid. Suitable salts may include, but are not limited to, alkali metal halides, such as chlorides, hydroxides, or carboxylates. In one or more embodiments, salts included as part of the aqueous-based fluid may include salts that disassociate into ions of sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, and fluorides, and combinations thereof. Without being bound by any theory, brines may be used to create osmotic balance between the injection fluid and portions of the subterranean formation, such as swellable clays.

In one or more embodiments, the injection fluid may comprise one or more salts in an amount that ranges from about 1 to about 300 ppb (pounds per barrel). For example, the injection fluid may contain the one or more salts in an amount ranging from a lower limit of any of 1, 10, 50, 80, 100, 120, 150, 180, 200, 250 and 280 ppb, to an upper limit of any of 20, 30, 40, 50, 70, 100, 120, 150, 180, 200, 220, 240, 260, 280 and 300 ppb, where any lower limit can be used in combination with any mathematically-compatible upper limit.

In one or more embodiments, the injection fluid may have a pH close to neutral. For example, the injection fluid of one or more embodiments may have a pH ranging from 5 to 9, from 5 to 8, from 5 to 7, from 6 to 9, from 6 to 8, from 6 to 7, from 7 to 9, or from 7 to 8.

In one or more embodiments, the injection fluid may comprise a suitable amount of the previously described phase-changing nanodroplets. In one or more embodiments, the phase-changing nanodroplets are present in the injection fluid in an amount ranging from about 0.1 to 10 wt % (weight percent). For example, the injection fluid may contain the phase-changing nanodroplets in an amount ranging from a lower limit of any of 0.1, 0.2, 0.5, 1.0, 1.5, 2.0, 2.5, 3.0, 3.5, 4.0, and 4.5 wt % to an upper limit of any of 5.0, 5.5, 6.0, 6.5, 7.0, 7.5, 8.0, 8.5, 9.0, 9.5, and 10 wt % where any lower limit may be used in combination with any mathematically compatible upper limit.

In some embodiments, the injection fluid may include additives such as viscosifiers and/or emulsifiers to stabilize the phase-changing nanodroplets. Examples of viscosifiers include, but are not limited to, xanthan gum and polymers used in enhanced oil recovery such as sulphonated polyacrylamides, e.g., AN-132 (copolymer of acrylamide (AM) with acrylamide tertiary-butyl sulfonic acid (ATBS or AMPS) with 32 mol % degree of sulfonation) and AN-125 (copolymer of AM/AMPS 75/25 mol % (25 mol % degree of sulfonation)). Viscosifiers may be included in the injection fluid in a concentration at or below 0.02 wt %. For example, viscosifiers may be included in a concentration at or below, 0.02 wt %, at or below 0.015 wt %, at or below 0.01 wt %, or at or below 0.005 wt %. Suitable emulsifiers include, for example, anionic surfactants and polymers, cationic surfactants and polymers, and zwitterionic surfactant and polymers, among others. The concentration of emulsifier that may be included in the injection fluid may depend on the critical micelle concentration of the emulsifier included. In general, the emulsifier may be injected at concentration above the critical micelle concentration.

Embodiments of the present disclosure may provide at least one of the following advantages. Superheated phase-changing nanodroplets according to embodiments of the present disclosure may be used for targeted treatment of a wellbore and NWR. The PFC core of superheated phase-changing nanodroplets may be formulated to have a boiling point similar or equal to the downhole temperature of a target treatment region. As such, wellbore cleanup and/or formation stimulation may be restricted to a specific region of the wellbore having a downhole temperature range using the compositions disclosed herein having corresponding boiling points. Similarly, phase-changing nanodroplets may be formulated to expand deep into the formation, resulting in more uniform, targeted stimulation treatments.

Additionally, by using injection fluid and phase-changing nanodroplet mixtures according to embodiments of the present disclosure, an injection fluid having a neutral or close to neutral pH may be used as a substitute for acid stimulation.

Examples

Poly(lactic-co-glycolic acid) (PLGA) was provided by Boehringer-Ingelheim, perfluoropentane, perfluorohexane, perfluorooctane, and perfluorodecalin were provided by Fluorochem, phospholipids we provided for Avanti Polar Lipids, Zonyl FSO fluorosurfactant and BSA were provided by Sigma Aldrich.

Examples of phase-changing nanodroplets include perfluoropentane encapsulated in PLGA, perfluorohexane encapsulated in PLGA, perfluorooctane encapsulated in PLGA, perfluorodecalin encapsulated in PLGA, perfluoropentane encapsulated in a phospholipid shell; perfluorohexane nanodroplets stabilized with Zonyl FSO fluorosurfactant, perfluoropentante encapsulated in bovine serum albumin (BSA).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:
1. A method comprising:
providing an injection fluid comprising phase-changing nanodroplets and an aqueous-based fluid wherein the phase-changing nanodroplets comprise:
a liquid core; and
a shell;
injecting the injection fluid into a wellbore at a first temperature;
exposing the phase-changing nanodroplets to a second temperature in the wellbore,
wherein the second temperature is greater than or equal to a boiling point of the liquid core, and
wherein exposure of the phase-changing nanodroplets to the second temperature changes a liquid in the liquid core to a vapor phase and expands the phase-changing nanodroplets; and
removing debris from the wellbore and surrounding area by expansion of the phase-changing nanodroplets.

2. The method of claim 1, wherein the liquid in the liquid core has an initial boiling point under an ambient pressure, when the liquid is not within the shell, that is less than the boiling point of the liquid core within the shell.

3. The method of claim 1, wherein the liquid core is a perfluorocarbon compound selected from the group consisting of octafluoropropane, perfluorobutane, perfluoropentane, perfluorohexane, perfluorohexyl bromide, perfluorooctyl bromide, perfluoro-15-crown-5-ether, and combinations thereof.

4. The method of claim 1, wherein the shell is a polymer shell selected from the group consisting of poly(lactic-co-glycolic) acid (PLGA), fluoroalkyl methacrylate, fluoroalkyl 2-trifluoromethylacrylate, fluoroalkyl(C6) ethyl acrylate, fluoroalkyl pentacarbonylmanganese(I), co-polymers of poly(ethylene) glycol and poly(l-lactic) acid (PEG/PLLA), co-polymers of poly(ethylene) glycol and polycaprolactone (PEG/PCL), and combinations thereof.

5. The method of claim 1, wherein the shell is a surfactant shell made from a nonionic ethoxylated fluorosurfactant.

6. The method of claim 1, wherein the aqueous-based fluid is water.

7. The method of claim 1, wherein the injection fluid further comprises a viscosifier, an emulsifier, or a combination thereof.

8. The method of claim 7, wherein the viscosifiers is selected from the group consisting of xanthan gum, sulphonated polyacrylamides, and combinations thereof.

9. The method of claim 7, wherein the emulsifier is selected from the group consisting of anion surfactants, anionic polymers, cationic surfactants, cationic polymers, zwitterionic surfactants, zwitterionic polymers, and combinations thereof.

10. The method of claim 1, wherein the phase-changing nanodroplets are present in the injection fluid in an amount ranging from 0.1 to 10 wt %.

* * * * *